(12) United States Patent
Gould et al.

(10) Patent No.: US 11,499,479 B2
(45) Date of Patent: Nov. 15, 2022

(54) AIR DELIVERY SYSTEM FOR A GAS TURBINE ENGINE

(71) Applicants: GENERAL ELECTRIC COMPANY, Schenectady, NY (US); General Electric Company Polska sp. z o.o, Warsaw (PL)

(72) Inventors: Kenneth Arthur Gould, Winchester, MA (US); Abdus Shamim, Cincinnati, OH (US); Jaroslaw Henryk Dekowski, Mazowieckie (PL); Piotr Sebastian Hance, Mazowieckie (PL); Przemyslaw Slawomir Tkaczyk, Mazowieckie (PL); Marcin Pawel Faber, Mazowieckie (PL); Adam Krysztopa, Mazowieckie (PL); Piotr Lech Bar, Mazowieckie (PL); Krzysztof Chelstowski, Mazowieckie (PL); Craig Alan Gonyou, Blanchester, OH (US); Robert John Parks, Ipswich, MA (US)

(73) Assignees: General Electric Company, Schenectady, NY (US); GENERAL ELECTRIC COMPANY POLSKA SP. ZO.O, Warsaw (PL)

( * ) Notice: Subject to any disclaimer, the term of this patent is extended or adjusted under 35 U.S.C. 154(b) by 414 days.

(21) Appl. No.: 16/057,892

(22) Filed: Aug. 8, 2018

(65) Prior Publication Data

US 2019/0063324 A1    Feb. 28, 2019

(30) Foreign Application Priority Data

Aug. 31, 2017  (EP) .................................... 17461597

(51) Int. Cl.
*F02C 6/08*    (2006.01)
*F02C 7/18*    (2006.01)
(Continued)

(52) U.S. Cl.
CPC .................. *F02C 7/18* (2013.01); *F02C 3/08* (2013.01); *F02C 6/08* (2013.01); *F02C 7/185* (2013.01);
(Continued)

(58) Field of Classification Search
CPC ........... F02C 6/08; F02C 7/185; F02C 25/125
See application file for complete search history.

(56) References Cited

U.S. PATENT DOCUMENTS 2,584,899 A * 2/1952 Roderick ................ F01D 25/12
                                                        415/115
3,027,971 A    4/1962 Ketler, Jr.
(Continued)

FOREIGN PATENT DOCUMENTS

CA    2475404 A1    1/2005
CA    2716237        4/2011
(Continued)

OTHER PUBLICATIONS

European Search Report and Written Opinion dated Feb. 13, 2018 which was issued in connection with EP17461597.1 which was filed on Aug. 31, 2017.

(Continued)

*Primary Examiner* — Gerald L Sung
(74) *Attorney, Agent, or Firm* — Dority & Manning, P.A.

(57) ABSTRACT

A gas turbine engine having an improved air delivery system that includes features for pressurizing and/or cooling various components of the engine while minimizing the impact to the cycle efficiency of the engine, reducing the weight of the engine, and reducing the specific fuel consumption of the engine is provided.

18 Claims, 6 Drawing Sheets

(51) Int. Cl.
  *F02C 3/08* (2006.01)
  *F02C 9/18* (2006.01)
(52) U.S. Cl.
  CPC ............ *F02C 9/18* (2013.01); *F05D 2220/32* (2013.01); *F05D 2260/232* (2013.01)

(56) References Cited

U.S. PATENT DOCUMENTS

| | | |
|---|---|---|
| 3,347,553 A | 10/1967 | Schweiger |
| 3,575,522 A | 4/1971 | Melenchuk |
| 3,844,110 A | 10/1974 | Widlansky et al. |
| 4,264,271 A * | 4/1981 | Libertini ................. F01D 11/08 415/134 |
| 4,349,314 A * | 9/1982 | Erwin ..................... F04D 21/00 415/181 |
| 4,436,481 A * | 3/1984 | Linder .................... F02C 7/045 138/37 |
| 4,542,623 A * | 9/1985 | Hovan ................. F01D 25/125 165/51 |
| 4,561,246 A * | 12/1985 | Hovan ................. F01D 25/125 165/51 |
| 4,761,947 A * | 8/1988 | Hennecke ................. F02C 7/18 60/806 |
| 5,134,844 A | 8/1992 | Lee et al. |
| 5,311,749 A | 5/1994 | McAuliffe et al. |
| 5,593,274 A | 1/1997 | Carreno et al. |
| 5,619,850 A | 4/1997 | Palmer et al. |
| 5,735,676 A | 4/1998 | Loos |
| 5,996,331 A * | 12/1999 | Palmer ..................... F02C 6/08 415/115 |
| 6,035,627 A * | 3/2000 | Liu ....................... F04D 29/284 60/785 |
| 6,098,395 A | 8/2000 | North |
| 6,276,896 B1 * | 8/2001 | Burge ..................... F01D 5/048 415/115 |
| 6,290,464 B1 | 9/2001 | Negulescu et al. |
| 6,412,270 B1 * | 7/2002 | Mortzheim ............. F01D 11/04 415/144 |
| 6,799,112 B1 | 9/2004 | Carter et al. |
| 7,007,488 B2 | 3/2006 | Orlando et al. |
| 7,093,418 B2 | 8/2006 | Morris et al. |
| 7,296,398 B2 | 11/2007 | Moniz et al. |
| 7,344,354 B2 | 3/2008 | Lammas et al. |
| 7,458,202 B2 | 12/2008 | Moniz et al. |
| 7,584,619 B2 | 9/2009 | Granitz et al. |
| 7,775,764 B2 | 8/2010 | Snowsill et al. |
| 7,836,675 B2 | 11/2010 | Corattiyil et al. |
| 7,980,054 B2 | 7/2011 | Suciu et al. |
| 8,266,889 B2 | 9/2012 | Coffinberry |
| 8,366,382 B1 | 2/2013 | Muldoon et al. |
| 8,915,057 B2 | 12/2014 | Corattiyil et al. |
| 8,967,944 B2 | 3/2015 | Suciu et al. |
| 9,091,173 B2 | 7/2015 | Mosley et al. |
| 9,103,281 B2 | 8/2015 | King et al. |
| 9,194,294 B2 | 11/2015 | Suciu et al. |
| 9,382,844 B2 | 7/2016 | Muldoon et al. |
| 9,537,189 B2 * | 1/2017 | Lenk ................. H01M 8/04335 |
| 2003/0046938 A1 * | 3/2003 | Mortzheim ............... F02C 7/12 60/782 |
| 2006/0222499 A1 * | 10/2006 | Warikoo ................. F01D 5/066 416/183 |
| 2008/0310955 A1 * | 12/2008 | Norris ..................... F02C 7/185 415/178 |
| 2011/0129332 A1 * | 6/2011 | Behaghel ................ F01D 11/24 415/68 |
| 2011/0138819 A1 * | 6/2011 | Tanimura ................ F01D 25/30 60/796 |
| 2013/0177398 A1 * | 7/2013 | Dos Santos ........... F01D 25/125 415/116 |
| 2013/0192251 A1 | 8/2013 | Munsell et al. |
| 2015/0125264 A1 | 5/2015 | Lighty et al. |
| 2015/0285147 A1 | 10/2015 | Phillips et al. |
| 2015/0361811 A1 | 12/2015 | Schwarz et al. |
| 2016/0010555 A1 | 1/2016 | Suciu et al. |
| 2016/0024968 A1 | 1/2016 | Steams et al. |
| 2016/0084111 A1 | 3/2016 | Bei et al. |
| 2016/0131032 A1 | 5/2016 | Pomme |
| 2016/0169109 A1 * | 6/2016 | Liu ....................... F04D 29/522 60/782 |
| 2016/0177825 A1 | 6/2016 | Burghardt |
| 2016/0237903 A1 * | 8/2016 | Hiester .................. F01D 25/34 |
| 2018/0195395 A1 | 7/2018 | Johnson et al. |

FOREIGN PATENT DOCUMENTS

| | | |
|---|---|---|
| CA | 2913724 A1 | 10/2016 |
| CN | 1105103 A | 7/1995 |
| CN | 102536352 A | 7/2012 |
| EP | 3109411 | 12/2016 |
| JP | H07295292 A | 11/1995 |
| JP | 2011/127447 A | 6/2011 |
| WO | WO2014134513 | 9/2014 |

OTHER PUBLICATIONS

Canadian Office Action Corresponding to Application No. 3014977 dated Jun. 7, 2019.
Machine Translated Japanese office Action Corresponding to Application No. 2018156831 dated Nov. 5, 2019.
Machine Translated Chinese Search Report Corresponding to Application No. 201811011480 dated Oct. 13, 2020.

* cited by examiner

AIR DELIVERY SYSTEM FOR A GAS TURBINE ENGINE

FIELD

The present subject matter relates generally to gas turbine engines, and more particularly to air delivery systems for cooling various components of gas turbine engines.

BACKGROUND

Gas turbine engines for use with aircraft typically include various sump assemblies for housing bearing assemblies and cooling fluid (e.g., oil). Conventional sump assemblies generally require pressurized airflows to set the pressure differentials across their sealing elements. Sump pressurization airflow must be cool enough to prevent oil fires and coking. Thus, mid-compressor air, commonly referred to as P25 air, is typically bled from the compressor and used for pressurization of such sump assemblies. Although P25 air is cool enough to prevent oil fires and coking, P25 air is generally not sufficiently pressurized to properly set the pressure differentials across the sealing elements, leading to high leakages across the seals. Furthermore, conventional gas turbine engines typically include buffer cavities that provide a buffer or barrier around such sump assemblies such that P25 air delivered to the sump assembly does not mix with compressor discharge air, commonly referred to as P3 air, which is generally too hot to pressurize such sump assemblies as it causes coking of the oil. Accordingly, conventional sump assemblies typically require complex sealing elements, such as e.g., compressor discharge seals, to prevent mixing of P3 air with P25 air delivered to the buffer cavity of the sump.

In addition, conventional gas turbine engines typically utilize P3 air to cool and support the aft stage of a compressor (e.g., an impeller) of the engine. P3 air exits the compressor section of the engine through a diffuser at a relatively high temperature (i.e., T3). At certain pressure ratios, the exit temperature of the P3 air becomes too high, making lighter materials (e.g., titanium) for the compressor components not feasible. Accordingly, heavier materials must be used, increasing the weight of the engine.

Moreover, conventional gas turbine engines typically include cooling airflow for turbine disks, as well as stator vanes and turbine blades of the turbine of such engines. P3 air, P25 air, impeller tip air, and other sources have all been used as cooling airflow for such components. However, as P3, P25, and/or impeller tip air is bled off and used for cooling and/or pressurization, there is a penalty on the overall cycle efficiency of the engine. As airflow is bled or removed from the core air flowpath of the engine, the air is no longer available for useful work.

Accordingly, a gas turbine engine with an improved air delivery system would be useful.

BRIEF DESCRIPTION

Aspects and advantages of the invention will be set forth in part in the following description, or may be obvious from the description, or may be learned through practice of the invention.

In one exemplary aspect, the present disclosure is directed to a gas turbine engine defining an axial direction, a radial direction, and a circumferential direction. The gas turbine engine includes a compressor section having a compressor rotatable about the axial direction. The gas turbine engine also includes a turbine section having a turbine rotatable about the axial direction. The gas turbine engine further includes a shaft extending between and coupling the compressor and the turbine. The gas turbine engine additionally includes a combustion section disposed downstream of the compressor section and upstream of the turbine section, the combustion section defining a diffuser cavity and including a combustor defining a combustion chamber, the diffuser cavity located upstream of the combustion chamber. Moreover, The gas turbine engine includes a sump assembly comprising a sump frame and a bearing assembly positioned between the sump frame and the shaft, the sump frame at least partially defining a sump cavity. The gas turbine engine also includes a sump plenum defined at least partially by the sump frame opposite the sump cavity. In addition, the gas turbine engine includes an air delivery system. The air delivery system includes a heat exchanger. The air delivery system also includes a cooling duct extending from the compressor section to the heat exchanger for providing a cooling airflow to the heat exchanger. The air delivery system also includes a high pressure bleed duct extending from the combustion section to the heat exchanger and in airflow communication with the diffuser cavity, the high pressure bleed duct for delivering a P3 airflow to the heat exchanger. Moreover, the air delivery system includes a high pressure duct extending from the heat exchanger to the sump plenum. The heat exchanger is configured to cool the P3 airflow using the cooling airflow to form a P3X airflow, and wherein the high pressure duct is configured to deliver the P3X airflow to the sump plenum for pressurizing the sump cavity of the sump assembly.

In another exemplary aspect, the present disclosure is directed to a gas turbine engine defining an axial direction, a radial direction, and a circumferential direction. The gas turbine engine includes a compressor section having a compressor rotatable about the axial direction. The gas turbine engine further includes a turbine section having a turbine rotatable about the axial direction. The gas turbine engine also includes a shaft extending between and coupling the compressor and the turbine. The gas turbine engine further includes a combustion section disposed downstream of the compressor section and upstream of the turbine section, the combustion section defining a combustion chamber. In addition, the gas turbine engine includes a sump assembly comprising a sump frame at least partially defining a sump cavity. The gas turbine engine also includes a sump plenum defined at least partially by the sump frame opposite the sump cavity. Moreover, the gas turbine engine includes an air delivery system. The air delivery system includes a heat exchanger configured to receive a cooling airflow and a P3 airflow, wherein the heat exchanger is configured to cool the P3 airflow using the cooling airflow to form a P3X airflow. The air delivery system also includes a high pressure duct extending from the heat exchanger to the sump plenum for delivering the P3X airflow to the sump plenum for pressurizing the sump cavity of the sump assembly.

In another exemplary aspect, the present disclosure is directed to a method for cooling and pressurizing one or more components of a gas turbine engine. The gas turbine engine includes a compressor section having a compressor, a turbine, a shaft extending between and coupling the compressor and the turbine, and a combustion section disposed downstream of the compressor and upstream of the turbine, the combustion section defining a diffuser cavity and a combustion chamber, the diffuser cavity located upstream of the combustion chamber. The gas turbine engine further includes a sump assembly having a sump frame and a bearing assembly positioned between the sump frame and the shaft, the sump frame at least partially defining a sump cavity in which the bearing assembly is housed and a sump plenum opposite the sump cavity. The gas turbine engine further includes an air delivery system that includes a heat exchanger and an ejector. The method includes extracting a cooling airflow; extracting a P3 airflow from the combustion section downstream of the diffuser cavity and upstream of the combustion chamber; delivering the cooling airflow and the P3 airflow to the heat exchanger; cooling the P3 airflow with the cooling airflow via the heat exchanger to form a P3X airflow; and routing the P3X airflow to the sump plenum for pressurizing the sump cavity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a leading portion an engine and aft referring to a trailing portion of the engine. The terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

The present disclosure is directed generally to gas turbine engines having improved air delivery systems that include features for pressurizing and cooling various components of the engine while minimizing the impact to the cycle efficiency of the engine, reducing the weight of the engine, and reducing the specific fuel consumption of the engine. In one exemplary aspect, a gas turbine engine includes an air delivery system. The air delivery system includes a heat exchanger that cools compressor discharge air, or P3 air. The resultant cooled P3 air, or P3X air, is delivered to one or more sump assemblies of the gas turbine engine for pressurizing the sealing elements thereof. In particular, the P3X air is delivered to a sump plenum surrounding a sump assembly. P3X air can be delivered to more than one sump assembly of the gas turbine engine. The P3X air is cooled by the heat exchanger to a sufficient degree such that the P3X air does not coke or create oil fires within or around the sump assembly. Moreover, the P3X air is sufficiently pressurized such that it may properly set the pressure differential across the sealing elements of the sump assembly. As a result, there may be lower leakages across sealing elements. Moreover, conventional buffer cavities surrounding such conventional sump assemblies can be eliminated, along with the structure and complex sealing elements (e.g., compressor discharge seals) that typically accompany such conventional buffer cavities. Accordingly, as a result, simpler sealing arrangements can be utilized and the weight of the engine can be reduced.

In additional exemplary aspects, the P3X air can be used to cool an aft stage of the compressor (e.g., an impeller). In this manner, lighter materials can be used for such compressor components, which can ultimately reduce the weight of the engine. Moreover, in some exemplary aspects, the P3X air can be used to cool one or more stages of turbine rotors, stator vanes, and/or turbine blades. Additionally, in some exemplary aspects, the P3X air can be used to cool and pressurize one or more other sump assemblies of the gas turbine engine. For example, in some embodiments, the gas turbine engine can include an A-sump assembly positioned proximate the inlet of the gas turbine engine for housing a first bearing assembly and the gas turbine engine can include a B-sump assembly positioned between the compressor in the turbine of the gas turbine engine for housing a second bearing assembly. In such an embodiment, the P3X air can first be delivered to pressurize the B-sump assembly and then can be routed to pressurize and/or cool the A-sump assembly. In alternative embodiments, the P3X air can be delivered directly to the A-sump assembly.

In yet other additional exemplary aspects, the heat exchanger can be an air-to-air heat exchanger. The cooling flow for the heat exchanger can be a combination of mid-compressor air, or P25 air and bay air. Depending on the required pressurization of one or more of the sump assemblies of the gas turbine engine and/or cooling needs of one or more components of the gas turbine engine, different amounts of P25 air can be bled from the compressor to increase the heat exchange between the cooling air mixture and the P3 air delivered to the heat exchanger. Moreover, after the cooling mixture has been used to cool the P3 air, the cooling air mixture can be delivered to one or more turbine casings or cowlings of the turbine of the gas turbine engine.

In this way, better active clearance control between the turbine blade tips and their corresponding shrouds can be achieved.

In addition, in accordance with exemplary aspects of the present disclosure, due to the reuse of the cooled, high pressure P3X air and other flows, the overall cooling flow demand is reduced. As a result, less air is required to be bled from the core air flowpath of the gas turbine engine, and thus, more working fluid is available for useful work. In this manner, engine performance is improved.

Figure 1:
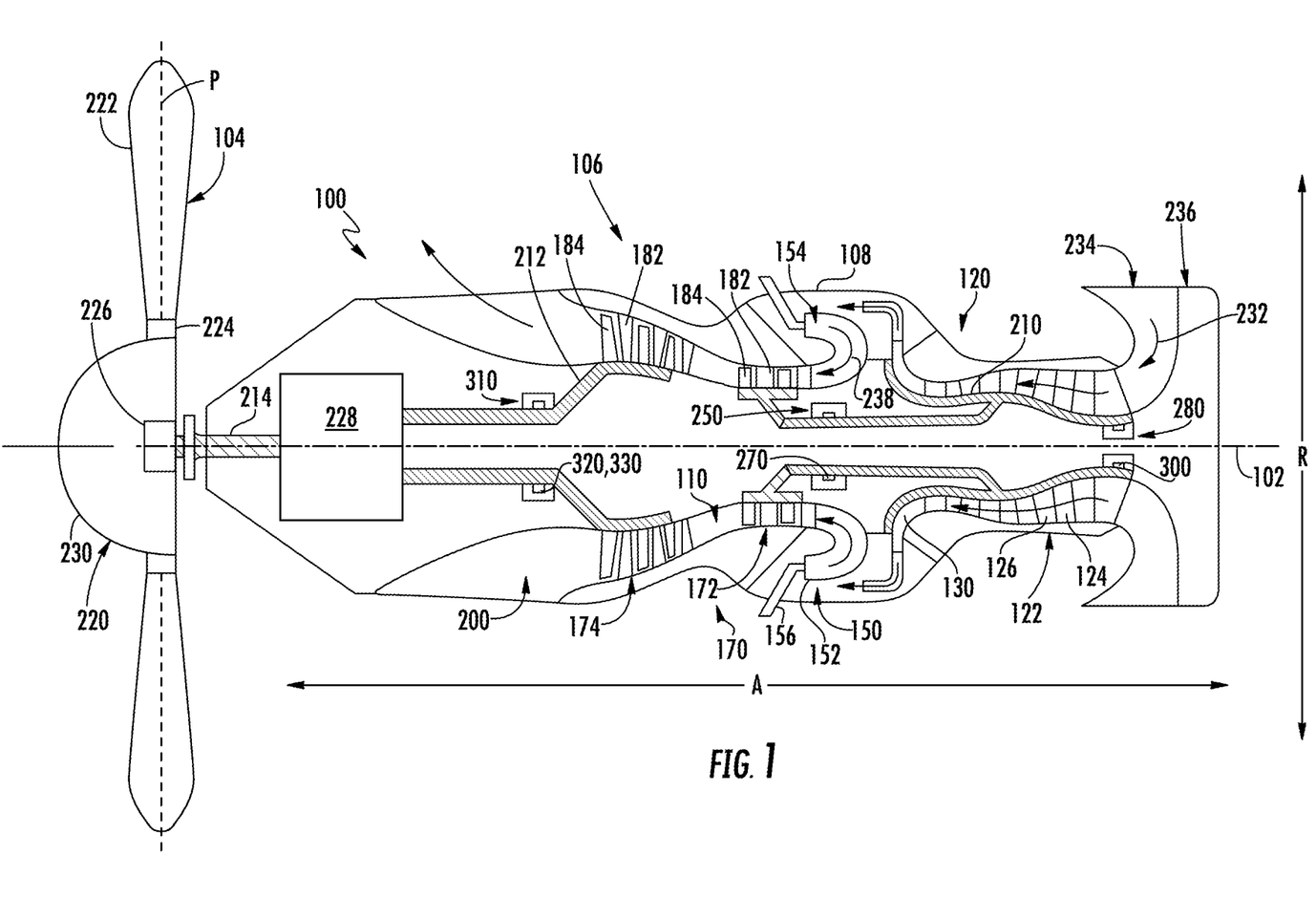
FIG. 1 is a schematic cross-sectional view of an exemplary gas turbine engine according to various embodiments of the present subject matter.

Referring now to the drawings, FIG. 1 provides a schematic cross-sectional view of a gas turbine engine 100 in accordance with an exemplary embodiment of the present disclosure. More particularly, for the embodiment of FIG. 1, the gas turbine engine 100 is a reverse-flow engine configured as a turboprop. As shown in FIG. 1, the gas turbine engine 100 defines an axial direction A (extending parallel to a central axis or longitudinal centerline 102 provided for reference), a radial direction R, and a circumferential direction C (not shown) disposed about the axial direction A. The gas turbine engine 100 generally includes a fan section 104 and a core turbine engine 106 disposed downstream from the fan section 104, the fan section 104 being operable with and driven by the core turbine engine 106.

The exemplary core turbine engine 106 depicted generally includes a substantially tubular outer casing 108 extending generally along axial direction A. The outer casing 108 generally encloses core turbine engine 106 and may be formed from a single casing or multiple casings. Core turbine engine 106 includes, in a serial flow relationship, a compressor section 120, a combustion section 150, a turbine section 170, and an exhaust section 200. The compressor section 120 includes a compressor 122 and a centrifugal impeller 130 positioned downstream of the compressor 122. The combustion section 150 includes a plurality of fuel nozzles 156 disposed about the longitudinal centerline 102 and spaced apart along the circumferential direction C. The combustion section 150 also includes a combustor 152 positioned downstream of the fuel nozzles 156. The combustor 152 defines a combustion chamber 154. The turbine section 170 includes an HP turbine 172 and an LP turbine 174. For this embodiment, the HP turbine 172 is a gas generation turbine for powering the compressor section 120. The LP turbine 174 is a free or power turbine that rotates about the longitudinal centerline 102 independently of the gas generation turbine, or for this embodiment, the HP turbine 172. The compressor section 120, combustion section 150, turbine section 170, and the exhaust section 200 are in fluid communication with each other and define a core air flowpath 110.

A high pressure (HP) shaft or spool 210, or for this embodiment a gas generation shaft, drivingly connects the HP turbine 172 to the compressor 122. A low pressure (LP) shaft or spool 212, or for this embodiment a power turbine shaft, drivingly connects the LP turbine 174 to the fan section 104 of the gas turbine engine 100. For the embodiment depicted, the fan section 104 includes a variable pitch fan 220 having a plurality of fan blades 222 coupled to a disk 224 in a spaced apart manner along the circumferential direction C. As depicted, the fan blades 222 extend outwardly from disk 224 generally along the radial direction R. Each fan blade 222 is rotatable relative to the disk 224 about a pitch axis P by virtue of the fan blades 222 being operatively coupled to a suitable actuation member 226 configured to collectively vary the pitch of the fan blades 222 in unison. The fan blades 222, disk 224, and actuation member 226 are together rotatable about the longitudinal axis 102 by the LP shaft 212 across a power gear box 228. The power gear box 228 includes a plurality of gears for stepping down the rotational speed of the LP shaft 212 to a more efficient rotational speed and is attached to one or both of a core frame or a fan frame through one or more coupling systems. In particular, LP shaft 212 drives a gear train housed within power gear box 228, which in turn operatively supplies power to the fan section 104 via an output shaft 214 at a reduced RPM. Disk 224 is covered by a rotatable spinner or front hub 230 aerodynamically contoured to promote an airflow through the plurality of fan blades 222.

During operation of the gas turbine engine 100, a volume of air 232 passes through blades 222 of fan 220 and is urged toward an annular inlet 234 of the core turbine engine 106. More specifically, gas turbine engine 100 includes an inlet body 236 that defines the annular inlet 234 that routes an inlet portion of the flow of air 232 from inlet 234 downstream to the compressor section 120. The compressor section 120 includes compressor 122 that includes one or more sequential stages of compressor stator vanes 124, one or more sequential stages of compressor rotor blades 126, and an impeller 130. The one or more sequential stages of compressor stator vanes 124 are coupled to the outer casing 108 and compressor rotor blades 126 are coupled to HP shaft 210 to progressively compress the flow of air 232. Impeller 130 further compresses air 232 and directs the compressed air 232 into the combustion section 150 where air 232 mixes with fuel. The combustor 152 combusts the air/fuel mixture to provide combustion gases 238.

Combustion gases 238 flow through HP turbine 172, which includes one or more sequential stages of turbine stator vanes 182 and one or more sequential stages of turbine blades 184. The one or more sequential stages of turbine stator vanes 182 are coupled to the outer casing 108 and the turbine blades 184 are coupled to HP shaft 210 to extract thermal and/or kinetic energy from the combustion gases 238. Combustion gases 238 subsequently flow through LP turbine 174, where an additional amount of energy is extracted through additional stages of turbine stator vanes 182 and turbine blades 184 coupled to LP shaft 212. The energy extraction from HP turbine 172 supports operation of the compressor 122 and impeller 130 through HP shaft 210 and the energy extraction from LP turbine 174 supports operation of fan section 104 through LP shaft 212. Combustion gases 238 exit gas turbine engine 100 through the exhaust section 200.

It should be appreciated that the exemplary gas turbine engine 100 depicted in FIG. 1 is by way of example only and that in other exemplary embodiments, gas turbine engine 100 may have any other suitable configuration. For example, it should be appreciated that in other exemplary embodiments, gas turbine engine 100 may instead be configured as any other suitable turbine engine, such as a turbofan engine, turbojet engine, internal combustion engine, etc. Furthermore, although gas turbine engine 100 described above is an aeronautical gas turbine engine for use in a fixed-wing or rotor aircraft, in other exemplary embodiments, gas turbine engine 100 may be configured as any suitable type of gas turbine engine that used in any number of applications, such as a land-based, industrial gas turbine engine, or an aeroderivative gas turbine engine.

In addition, in other exemplary embodiments, the turbine engine may include any suitable number of compressors, turbines, shafts, etc. For example, as will be appreciated, HP shaft 210 and LP shaft 212 may further be coupled to any suitable device for any suitable purpose. For example, in certain exemplary embodiments, gas turbine engine 100 of FIG. 1 may be utilized to drive a main rotor of a helicopter, may be utilized in aeroderivative applications, etc. Additionally, in other exemplary embodiments, gas turbine engine 100 may include any other suitable type of combustor, and may not include the exemplary reverse flow combustor depicted.

As shown further in FIG. 1, gas turbine engine 100 includes an A-sump assembly 280, a B-sump assembly 250, and a C-sump assembly 310. The A-sump assembly 280 is configured to house a first bearing assembly 300 (commonly referred to as bearing one (1)). The B-sump assembly 250 is configured to house a second bearing assembly 270 (commonly referred to as bearing two (2)). The C-sump assembly 310 is configured to house a third bearing assembly 320 (commonly referred to as bearing three (3)) and a fourth bearing assembly 330 (commonly referred to as bearing four (4)). For this embodiment, the A-sump assembly 280 and the first bearing assembly 300 are positioned proximate the inlet 234 and are disposed between core air flowpath 110 and longitudinal centerline 102. The B-sump assembly 250 and the second bearing assembly 270 are positioned proximate the HP turbine 172 and are likewise disposed between core air flowpath 110 and longitudinal centerline 102. The C-sump assembly 310 and the third and fourth bearing assemblies 320, 330 are positioned proximate the LP turbine 174 and are likewise disposed between core air flowpath 110 and longitudinal centerline 102.

Figure 2:
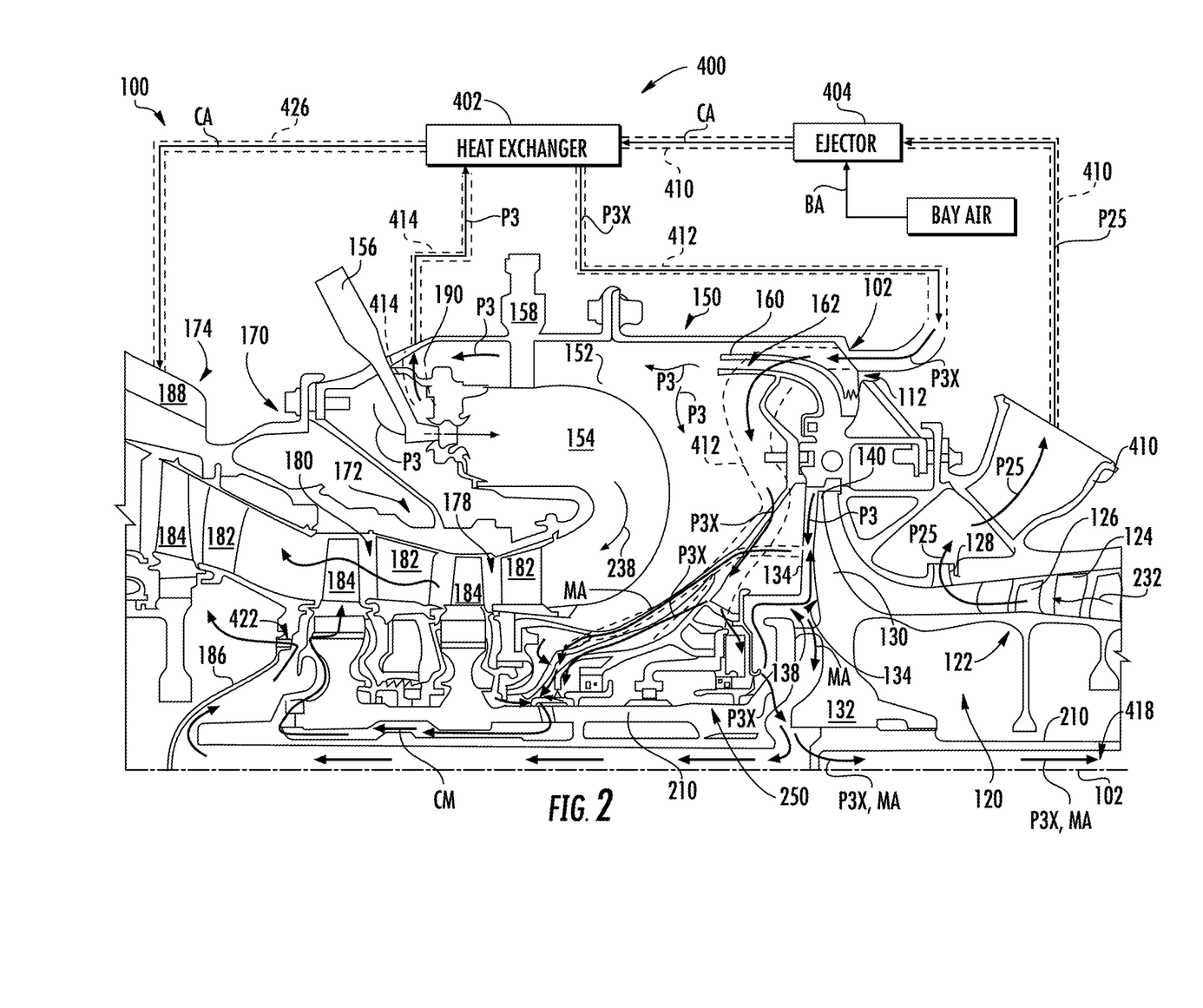
FIG. 2 provides a schematic view a portion of the compressor section, the combustion section, and a portion of the turbine section of the exemplary gas turbine engine 100 of FIG. 1 depicting an exemplary air delivery system according to various embodiments of the present subject matter.

FIG. 2 provides a schematic view of a portion of the compressor section 120, the combustion section 150, and a portion of the turbine section 170 of the exemplary gas turbine engine 100 of FIG. 1 according to various embodiments of the present subject matter. Moreover, FIG. 2 depicts an exemplary air delivery system 400 of the gas turbine engine 100 according to various embodiments of the present subject matter. As shown in the illustrated embodiment, the compressor 122 of the compressor section 120 progressively compresses the flow of air 232 as it passes through the sequential stages of compressor stator vanes 124 and compressor rotor blades 126. After exiting the compressor 122, most of the flow of air 232 continues downstream to the impeller 130 where the flow of air 232 is further compressed and directed radially outward along the radial direction R such that the flow of air 232 can be directed into the combustion section 150. More specifically, the flow of air 232 exits the compressor section 120 through a diffuser 160. The diffuser 160 defines a diffuser cavity 162 through which the flow of air 232 exits the diffuser 160. The flow of air 232 exiting through the diffuser 160 is commonly referred to as compressor discharge air, denoted herein as P3 air or a P3 airflow. After exiting through the diffuser 160, a portion of the P3 air flows into the combustor 152 and a portion of the P3 air flows about the combustor 152 as shown in FIG. 2.

Referring still to FIG. 2, fuel is introduced by the fuel nozzles 156 to the portion of the P3 air that flows into the combustor 152. An igniter 158 ignites the air/fuel mixture to provide combustion gases 238. Combustion gases 238 are then routed to the HP turbine 172. For this embodiment, the HP turbine 172 includes a first stage 178 of turbine stator vanes and rotor blades 182, 184 and a second stage 180 of turbine stator vanes and rotor blades 182, 184. The first and second stages 178, 180 extract thermal and/or kinetic energy from the combustion gases 238. In particular, the HP turbine 172 extracts energy for producing useful work to drive the HP shaft 210 (or the gas generator shaft), which in turn drives the compressor section 120. After exiting the HP turbine 172, the combustion gases 238 flow downstream along the core air flowpath 110 to the LP turbine 174 (or power turbine), where sequential stages of turbine stator vanes 182 and turbine rotor blades 184 further extract energy from the combustion gases 238. In this way, the LP turbine 174 drives the fan section 104 (FIG. 1).

The LP turbine 174 includes a turbine cooling case 188 for cooling the stator vanes 182 and turbine blades 184. For this embodiment, the turbine cooling case 188 is positioned radially outward of the stator vanes and turbine blades 182, 184 of the LP turbine 174. Notably, for this embodiment, the turbine cooling case 188 is in airflow communication with a heat exchanger 402, which will be described in more detail below. In some embodiments, a turbine cooling duct 426 extends from the heat exchanger 402 to the turbine cooling case 188 to provide such airflow communication. In some embodiments, the heat exchanger 402 is directly positioned radially outward of the cowling 176 of the LP turbine 174 (FIG. 5) and is in direct airflow communication with the turbine cooling case 188. As will be described in greater detail herein, after a cooling airflow exchanges heat with a P3 airflow, the cooling airflow can continue downstream to the turbine cooling case 188 via the turbine cooling duct 426 or directly to the turbine cooling case 188 as noted above.

As further shown in FIG. 2, after exiting the compressor 122, a portion of the flow of air 232 can be bled off prior to reaching the impeller 130. In particular, an amount of the flow of air 232 can be bled out of the core air flowpath 110 through a compressor bleed valve 128. The air bled through compressor bleed valve 128 is commonly referred to as P25 air or a P25 airflow. The compressor bleed valve 128 selectively allows a P25 airflow to exit from the compressor section 120, depending on the pressurization and cooling needs of various components of the gas turbine engine 100. Moreover, in alternative exemplary embodiments, one or more fixed orifices can provide fluid communication between the core air flowpath 110 and the cooling duct 410 as noted previously. The one or more orifices can be operatively configured to allow an amount of P25 to be bled into the cooling duct 410. For instance, the geometry of the orifices can selectively allow a predetermined amount of P25 airflow into the cooling duct 410. In yet other exemplary embodiments, the one or more orifices can include variable geometry such that the amount of P25 airflow bled into the cooling duct 410 can be controlled in accordance with the cooling and/or pressurization needs of one or more components of the gas turbine engine 100.

In addition, as further shown in FIG. 2, an amount of the flow of air 232 leaks out of the core air flowpath 110 at the tip of the impeller 130 and flows generally radially inward toward the longitudinal centerline 102 along the backwall 132 of the impeller 130. An impeller frame 134 is positioned proximate the impeller 130 along its backwall 132. The impeller frame 134 and the backwall 132 of the impeller 130 define an impeller cavity 138. In this way, the impeller frame 134 partially defines the impeller cavity 138 and the backwall 132 of the impeller 130 partially defines the impeller cavity 138. Air leaks out of the core air flowpath 110 at a tip 140 of the impeller 130 and flows into the impeller cavity 138. The air leaking into the impeller cavity 138 is P3 air.

Figure 3:
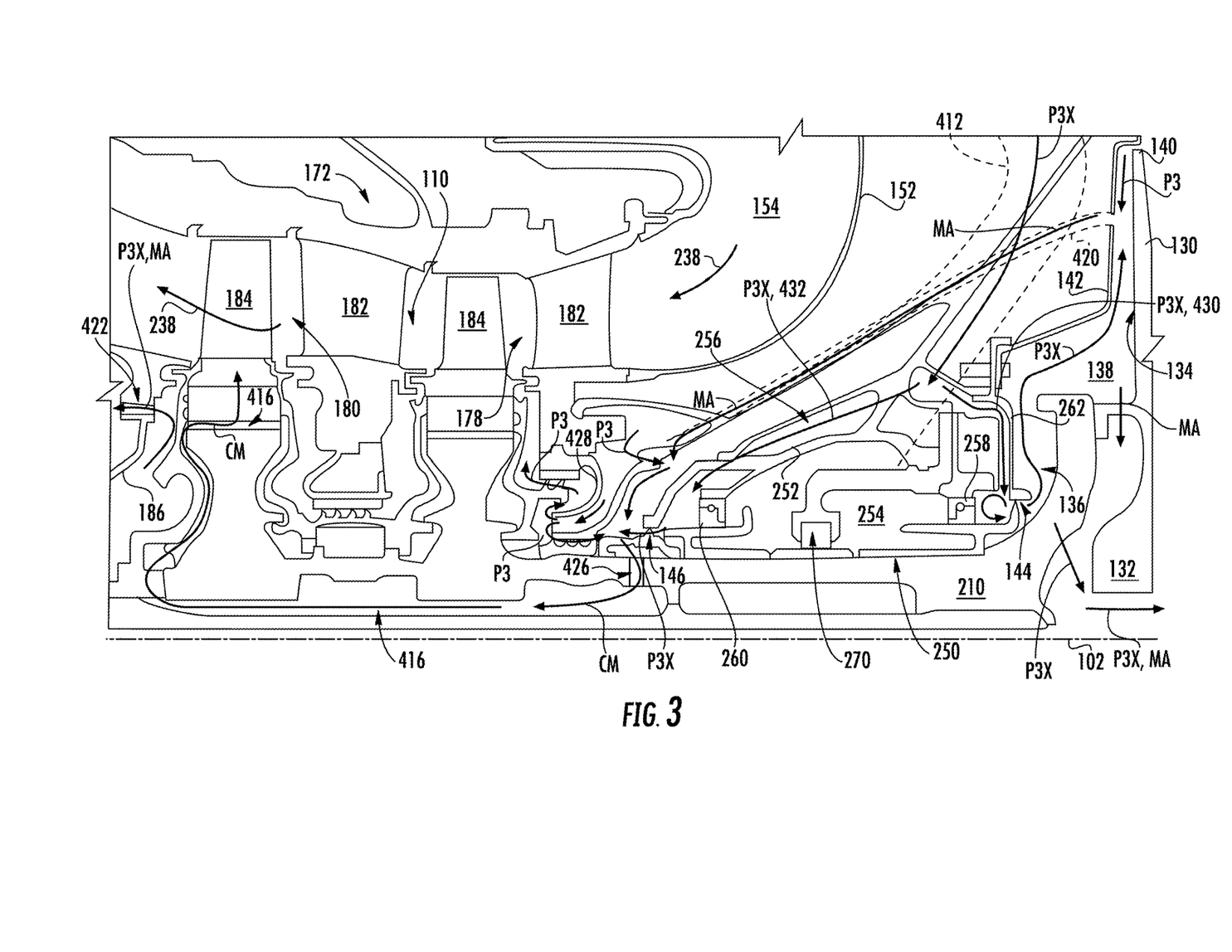
FIG. 3 provides a cross-sectional view of an exemplary B-sump assembly of the gas turbine engine of FIG. 1 according to various embodiments of the present subject matter.

FIG. 3 provides a cross-sectional view of the exemplary B-sump assembly 250 of the gas turbine engine of FIG. 1 according to various embodiments of the present subject matter. As depicted, the B-sump assembly 250 includes a sump frame 252 and houses the second bearing assembly 270. The second bearing assembly 270 is positioned between the sump frame 252 and the shaft, or for this embodiment, the HP shaft 210. The sump frame 252 at least partially defines a sump cavity 254. A sump plenum 256 is defined at least partially by the sump frame 252 opposite the sump cavity 254. Stated alternatively, sump plenum 256 is a region or area surrounding the sump assembly, which for this embodiment is the B-sump assembly 250.

The sump frame 252 is shown connecting to a first sealing element 258 at an aft or rear portion of the B-sump assembly 250 and connecting to a second sealing element 260 at a forward portion of the B-sump assembly 250. For this embodiment, the first and second sealing elements 258, 260 are carbon seals. In order to prevent oil mist and fluid leakage across first and second sealing elements 258, 260, a proper pressure differential must be set between the sump cavity 254 and the sump plenum 256.

Figure 4:
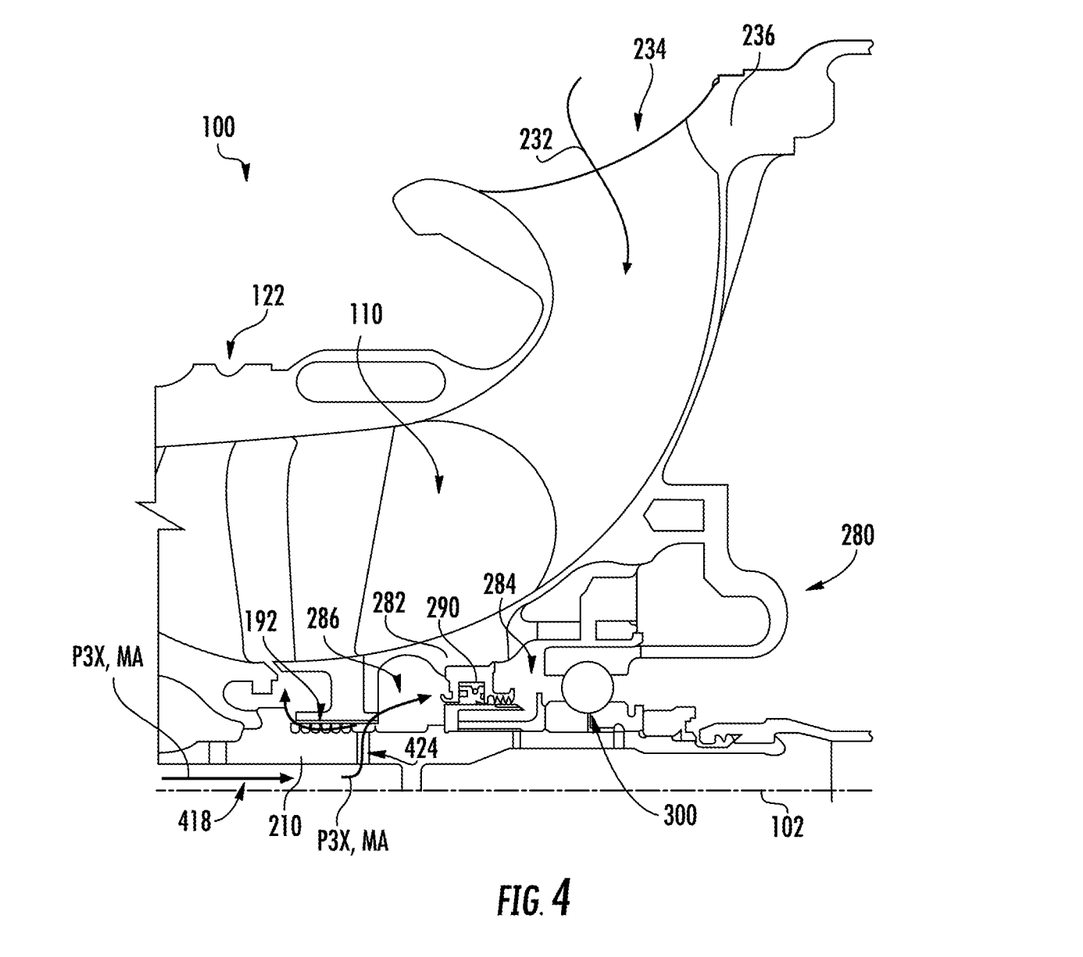
FIG. 4 provides a cross-sectional view of an exemplary A-sump assembly of the gas turbine engine of FIG. 1 according to various embodiments of the present subject matter.

FIG. 4 provides a cross-sectional view of the exemplary A-sump assembly 280 of the gas turbine engine 100 of FIG. 1 according to various embodiments of the present subject matter. As depicted, the A-sump assembly 280 is positioned proximate inlet 234 defined by inlet body 236 of the gas turbine engine 100. A-sump assembly 280 includes an A-sump frame 282 that houses the first bearing assembly 300. The first bearing assembly 300 is positioned between the A-sump frame 282 and the shaft, or for this embodiment, the HP shaft 210. The A-sump frame 282 at least partially defines an A-sump cavity 284. An A-sump plenum 286 is defined at least partially by the A-sump frame 282 opposite the A-sump cavity 284. Stated differently, the A-sump plenum 286 is a region or area surrounding the A-sump assembly 280.

The A-sump frame 282 is shown connecting to a first sealing element 290 at a forward portion of the A-sump assembly 280. For this embodiment, the first sealing element 290 is a carbon seal. In order to prevent oil mist and fluid leakage across the first sealing element 290, a proper pressure differential must be set between the A-sump cavity 284 and the A-sump plenum 286.

Figure 5:
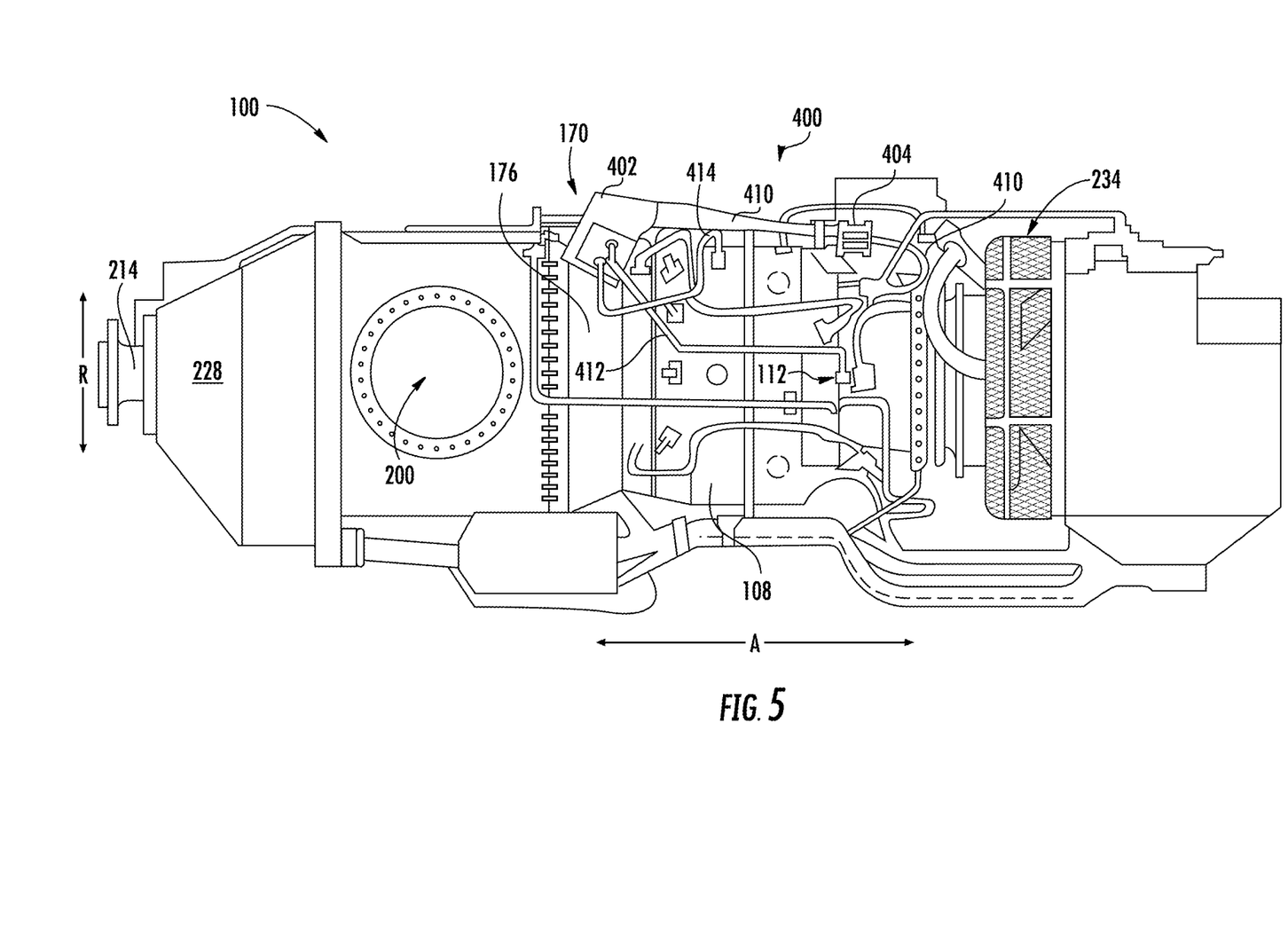
FIG. 5 provides a side view of the exemplary gas turbine engine of FIG. 1 according to various embodiments of the present subject matter.

Referring now to FIGS. 2 and 5, the air delivery system 400 will now be described. FIG. 5 provides a side view of the exemplary gas turbine engine 100 of FIG. 1 illustrating various components of the air delivery system 400 according to various embodiments of the present subject matter. For this embodiment, the air delivery system 400 includes a heat exchanger 402, an ejector 404, and various ducts and passages for routing air to one or more components of the gas turbine engine 100.

As shown in FIGS. 2 and 5, for this embodiment, the heat exchanger 402 is an air-to-air heat exchanger. However, heat exchanger 100 can be configured for receiving any suitable number and type of fluids for use in a heat transfer process. Moreover, for this embodiment, the heat exchanger 402 is configured for using a stream of cooling airflow CA to cool relatively hot, pressurized compressor discharge air (P3 air) such that it can be used to cool and/or pressurize various components of gas turbine engine 100. More specifically, the cooled P3 airflow, referred to herein as P3X air or P3X airflow, can be used to cool HP turbine 172 casings, LP turbine 174 casings, one or more turbine stator vanes 182 and turbine blades 184 of the LP turbine 174 and/or HP turbine 172, the backwall 132 of the impeller 130, the A-sump assembly 280, and to cool/pressurize the B-sump assembly 250. Additionally or alternatively, the P3X airflow can be used to cool/pressurize other components of the gas turbine engine 100 as well.

In FIG. 5, the heat exchanger 402 is shown positioned external to or integral with the outer casing 108 of the gas turbine engine 100. In particular, for this embodiment, heat exchanger 402 is positioned proximate the turbine section 170. More particularly still, the heat exchanger 402 is positioned proximate a cowling 176 that surrounds a turbine casing, which in turn surrounds the working components of HP and LP turbines 172, 174. In alternative embodiments, the heat exchanger 402 may be placed at any other suitable location within, integral with, or along the gas turbine engine 100 for harnessing fluid temperature differentials for heat transfer.

According to exemplary embodiments of the present subject matter, cooling air or a cooling airflow may be supplied to heat exchanger 402 from any suitable source. As illustrated schematically in FIG. 2, a cooling airflow, denoted by CA, is supplied to heat exchanger 402 by the ejector 404. The ejector 404 is configured for entraining a flow of bleed air from the compressor section 120 with bay air or a bay airflow BA, e.g., which may be ambient air, air flowing between the outer casing 108 and a nacelle of the engine, or in embodiments where the gas turbine engine 100 is configured as a bypass turbofan engine, a bypass airflow extracted from the bypass duct of the engine. In this manner, the cooling airflow CA can be a mixture of compressor bleed air (e.g., P25 air) and bay air BA. The P25 air extracted from the compressor section 120 can be used to increase or decrease the flow rate or amount of cooling airflow CA passing through heat exchanger 402. In this way, the P25 air can regulate the rate of heat transfer of the cooling airflow CA with the P3 airflow as the airflow streams are passed through the heat exchanger 402.

In some embodiments, P25 air is not used as part of the cooling airflow CA. In such embodiments, the bay airflow BA or some other cooling fluid is used to cool the P3 air. It should be appreciated that the embodiments described above are examples of possible cooling arrangements. It will further be appreciated that other components, features, and configurations are possible and remain within the scope of the present subject matter.

Referring still to FIGS. 2 and 5, as noted above, air delivery system 400 includes various ducts and passages for delivering cooling/pressurize airflow to various components of the gas turbine engine 100. In particular, for the depicted embodiment, the air delivery system 400 includes a cooling duct 410 extending from the compressor section 120 to the heat exchanger 402. More specifically, the cooling duct 410 extends from the compressor section 120 at a location downstream of the compressor 122 and upstream of the impeller 130. The compressor bleed valve 128 selectively allows a P25 airflow through the cooling duct 410 based upon the cooling/pressurization needs of the components of the gas turbine engine 100. In alternative exemplary embodiments, one or more fixed orfices may provide fluid communication between the core air flowpath 110 and the cooling duct 410. The one or more orifices can be operatively configured to allow an amount of P25 to be bled into the cooling duct 410. For instance, the geometry of the orifices can selectively allow a predetermined amount of P25 airflow into the cooling duct 410. In yet other exemplary embodiments, the one or more orifices can include variable geometry such that the amount of P25 airflow bled into the cooling duct 410 can be controlled in accordance with the cooling and/or pressurization needs of one or more components of the gas turbine engine 100.

With reference specifically to FIG. 5, for this embodiment, the cooling duct 410 extends in a generally forward direction along the axial direction A and extends externally to the core turbine engine 106. The ejector 404 is shown positioned along the cooling duct 410 such that the ejector 404 can receive the P25 air from the compressor section 120 and entrain the P25 airflow with bay airflow BA to form the cooling airflow CA. The cooling airflow CA is then routed along the cooling duct 410 to the heat exchanger 402.

In some exemplary embodiments, the cooling duct 410 can extend from a different location along the compressor section 120. For example, the cooling duct 410 can extend from a position along the core airflow path 110 radially outward of the compressor 122. In other exemplary embodiments, particularly where the gas turbine engine 100 is a bypass turbofan engine, the cooling duct 410 can extend from the bypass duct of the turbofan engine. It will be appreciated that the cooling duct 410 can extend from other suitable locations.

As further shown in FIGS. 2 and 5, the air delivery system 400 also includes an HP bleed duct 414 that extends from the combustion section 150 to the heat exchanger 402. For this embodiment, the HP bleed duct 414 extends from the combustion section 150 downstream of the diffuser 160 and upstream of the combustor 152. The HP bleed duct 414 is configured to deliver an amount of P3 airflow to the heat exchanger 402. An HP bleed duct valve 190 selectively allows the P3 airflow to be delivered to the heat exchanger 402 based upon the cooling and/or pressurization needs of the components of the gas turbine engine 100. For example, if the B-sump assembly 250 requires increased pressurization, the HP bleed duct valve 190 can be actuated to an open position such that an amount of P3 airflow flows to the heat exchanger 402 such that the P3 air can be cooled and subsequently routed to the B-sump assembly 250. It will be appreciated that the HP bleed duct 414 can extend from the combustion section 150 from any suitable location. In some exemplary embodiments, one or more fixed orfices may provide fluid communication between the core air flowpath 110 along the combustion section 150 and the HP bleed duct 414. The one or more orifices can be operatively configured to allow an amount of P3 to bleed into the HP bleed duct 414. For instance, the geometry of the orifices can selectively allow a predetermined amount of P3 airflow into the HP bleed duct 414. In yet other exemplary embodiments, the one or more orifices can include variable geometry such that the amount of P3 airflow bled into the HP bleed duct 414 can be controlled in accordance with the cooling and/or pressurization needs of one or more components of the gas turbine engine 100.

Referring still to FIGS. 2 and 5, as shown particularly in FIG. 2, the air delivery system 400 also includes an HP duct 412 extending from the heat exchanger 402 to the B-sump assembly 250. In particular, the HP duct 412 extends from the heat exchanger 402 to the sump plenum 256, or for this embodiment, the B-sump plenum. The HP duct 412 is configured to deliver P3X air to the B-sump assembly 250 for pressurizing the first and second sealing elements 258, 260 such that a proper pressure differential can be set across the sealing elements. As shown particularly in FIG. 5, the HP duct 412 extends externally to the core turbine engine 106 from the heat exchanger 402 to a position proximate the aft end of the compressor section 120 in a rearward or aft direction along the axial direction A.

Referring again to FIG. 3, the air delivery system 400 includes a turbine cooling passage 416 extending from the sump plenum 256 of the B-sump assembly 250 to a turbine blade 184 of the second stage 180 of the HP turbine 172. The turbine cooling passage 416 is defined at least in part by the HP shaft 210. Moreover, as shown in FIG. 3, the HP shaft 210 defines an HP shaft aperture 426 that provides airflow communication between the sump plenum 256 and the turbine cooling passage 416. For this embodiment, the turbine cooling passage 416 extends along the axial direction A through the HP shaft 210 and then transitions radially outward along the radial direction R. In particular, as the turbine cooling passage 416 extends radially outward, the turbine cooling passage 416 extends along a rotor of the second stage turbine blade 184. The turbine cooling passage 416 then transitions to a rear or aft direction along the axial direction A, and finally, the turbine cooling passage 416 extends radially outward once again toward the second stage turbine blade 184. In other exemplary embodiments, the HP shaft 210 can include other HP shaft apertures that provide airflow communication to the rotor and turbine blade of the first stage of the HP turbine 172. In yet further exemplary embodiments, the turbine cooling passage 416 can extend to cool the second stage stator vane 182.

Referring again to FIG. 2, the air delivery system 400 includes a LP turbine passage 422 defined at least in part by a turbine frame member 186. For this exemplary embodiment, the turbine frame member 186 is disposed between the HP turbine 172 and the LP turbine 174. More specifically, the turbine frame member 186 separates the HP turbine 172 and the LP turbine 174. The LP turbine passage 422 provides airflow communication between the HP turbine 172 and the LP turbine 174. In this way, P3X air flowing in a forward direction along the axial direction A radially inward of the HP shaft 210 can flow through the LP turbine passage 422 toward the rotor assemblies of the LP turbine 174 for cooling the rotor assemblies and other components of the LP turbine 174.

Moreover, as shown in FIGS. 2 and 4, air delivery system 400 includes an A-sump passage 418 extending from the sump plenum 256 to the A-sump assembly 280, or more particularly from the sump plenum 256 of the B-sump assembly 250 and the A-sump plenum 286 of the A-sump assembly 280. As shown, the A-sump passage 418 extends generally along the axial direction A along proximate the axial centerline 102. The A-sump passage 418 is configured for delivering a portion of P3X airflow to the A-sump plenum 286 such that the cooled, high pressure P3X airflow can pressurize the first sealing element 290 of the A-sump assembly 280. Moreover, as shown in FIG. 4, the HP shaft 210 defines an A-sump aperture 424. The A-sump aperture 424 provides airflow communication between the A-sump passage 418 and the A-sump plenum 286. In this manner, P3X airflow can flow from the sump plenum 256 to the A-sump plenum 286 such that the high pressure P3X air can pressurize the A-sump assembly 280.

Additionally, as shown more particularly in FIG. 3, an impeller passage 136 extends from the sump plenum 256 of the B-sump assembly 250 to the impeller cavity 138. The impeller passage 136 is defined at least in part by a static frame member 262 and the HP shaft 210. The impeller passage 136 provides airflow communication between the sump plenum 256 and the impeller cavity 138. In this manner, and amount of P3X airflow can be delivered to the impeller cavity 138 for cooling the impeller 130.

As shown particularly in FIG. 3, a mixed airflow duct 420 (shown by the dashed lines in FIG. 3) extends from the impeller cavity 138 to a location forward of of the B-sump assembly 250. The mixed airflow duct 420 delivers an amount of mixed airflow MA. The mixed airflow MA includes cooled P3X air that has traveled up the back wall 163 of the impeller 130 through the impeller cavity 138 and P3 air that has leaked out of the core airflow path 110 proximate the tip of the impeller 130. The mixed airflow duct 420 allows for delivery and reuse of the P3X air and high pressure P3 air for cooling various components of the gas turbine engine 100. For example, the mixed airflow MA can be reused for cooling one or more stages of stator vanes and turbine blades 182, 184 of the HP turbine 172 and/or one or more components of the LP turbine 174.

As noted previously, as further shown in FIGS. 2 and 5, the air delivery system 400 further includes a turbine cooling duct 426 extending from the heat exchanger 402 to the power or LP turbine 174. In some exemplary embodiments, there is no turbine cooling duct 426 extending from the heat exchanger 402 to the LP turbine 174. Rather, in such exemplary embodiments, the cooling air CA used to cool the P3 air feeds directly into the turbine cooling case 188.

Referring now to FIGS. 2 through 5, the manner in which air delivery system 400 delivers cooling/pressurized airflow to the various components of gas turbine engine 100 will be described. It will be appreciated that the description below and accompanying figures describing and depicting the manner in which the air delivery system 400 delivers cooling/pressurized airflow to the various components of gas turbine engine is for example purposes and that various features described below can be modified, adapted, expanded, rearranged and/or omitted in various ways without deviating from the scope of the present subject matter.

As shown in FIG. 2, mid-compressor air, or P25 air, is bled off from the core airflow path 110 and into the cooling duct 410. The cooling duct 410 routes the P25 air to the ejector 404. The ejector 404 entrains bay airflow BA by means of a P25 airflow jet. In some embodiments, the bay airflow BA can be bypass airflow extracted from a high bypass duct of a turbofan engine, ambient air, air extracted from between a space defined between the nacelle of the engine and the core turbine engine, a combination of the foregoing, etc. After the ejector 404 entrains the P25 airflow with the bay airflow BA to form an amount of cooling airflow CA, the cooling airflow CA is routed to the heat exchanger 402 via the cooling duct 410. The compressor bleed valve 128 selectively allows an amount of P25 airflow to exit from the compressor section 120, depending on the pressurization and cooling needs of various components of the gas turbine engine 100 (or the one or more orifices allow for an amount of P25 airflow to bleed off from the compressor section 120). At the same time, compressor discharge air, or P3 air, is bled off from the combustion section 150 and routed to the heat exchanger 402 via HP bleed duct 414. The HP bleed valve 190 can selectively allow a predetermined amount of P3 air to be bled to the heat exchanger 402.

The heat exchanger 402 receives the cooling airflow CA from the ejector 404 and the relatively hot and high pressure P3 airflow from the combustion section 150. In an air-to-air heat exchange, the relatively hot P3 airflow exchanges heat with the cooling airflow CA. For this embodiment, the cooling airflow CA does not mix with the hot P3 air. The heat exchanger 402 cools the P3 air, resulting in a cooled, high pressure air, or P3X air. The P3X airflow is cooler than the P3 airflow and is at a comparable pressure to the pressure within one or more of the sump assemblies of the gas turbine engine 100.

For this embodiment, the cooling airflow CA used to cool the P3 air is routed via the turbine cooling duct 426 to cool components of the LP turbine 174, as shown in FIG. 2. Additionally or alternatively, in some embodiments, the cooling airflow CA used to cool the P3 air is ejected to the ambient environment or used to cool other components of the gas turbine engine 100. For example, in some exemplary embodiments, the cooling airflow CA can be routed to cool or impinge the turbine casing of the HP turbine 172.

Referring still to FIG. 2, the cooled, high pressure P3X airflow exits the heat exchanger 402 and is routed to the B-sump assembly 250 via the HP duct 412, and more particularly, the P3X airflow is routed to the sump plenum 256 of the B-sump assembly 250. For this embodiment, the HP duct 412 extends from the heat exchanger 402 through an opening 112 defined in casing 108 (FIGS. 2 and 5). The HP duct 412 then extends along the radial direction R toward the longitudinal centerline 102 between the last stage of the compressor section 120 (i.e., impeller 130) and the combustor 152 of the combustion section 150 where it terminates proximate B-sump assembly 250. In particular, the HP duct opens up into the sump plenum 256 of the B-sump assembly 250. For this embodiment, the HP duct 412 includes a plurality of passageways that enable a more even distribution of P3X airflow into the forward, middle, and aft portions of the sump plenum 256.

As shown in FIG. 3, the high pressure P3X air is delivered to the B-sump assembly 250 and is distributed generally over or about the sump frame 252. A first portion 430 of P3X airflow travels along sump frame 252 in a generally aft or rear direction along the axial direction A and a second portion 432 of P3X airflow travels along the sump frame 252 in a generally forward direction along the axial direction A. The first portion 430 of P3X airflow pressurizes the first sealing element 258 of the B-sump assembly 250. As the P3X air is pressurized to a sufficient degree, the pressure differential across the first sealing element 258 is such that the oil mist is maintained within the sump cavity 254 and oil leakage across the first sealing element 258 is minimized and/or reduced. Moreover, in embodiments where the P3X airflow is cooled by the heat exchanger 402 to a sufficient degree, the high pressure P3X airflow does not cause coking and/or oil fires within or around the B-sump assembly 250.

Referring still to FIG. 3, as shown for this exemplary embodiment, after the P3X air flows past the first sealing element 258, at least a portion of the first portion 430 of the P3X airflow continues to flow generally in an aft or rear direction along the radial direction R. In particular, at least a portion of the first portion 430 of P3X airflow travels past an aft sealing element 144 and into the impeller passage 136. The first portion 430 of P3X air flows upward through the impeller passage 136 along the radial direction R and into the impeller cavity 138. At the same time, P3 air leaks into the impeller cavity 138 at or near the tip 173 of the impeller 130. The P3X airflow mixes with the P3 air. The mixture of the P3X air and the P3 airflow flowing along the impeller backwall 132 cools the impeller 130. In some exemplary embodiments, the mixture of the P3X air and the P3 air is cool enough to cool the impeller 130 to such a degree that lighter materials for the impeller 130 are feasible even at the most extreme pressure ratios experienced by the gas turbine engine 100 during operation. In this way, in some exemplary embodiments, the impeller 130 can be formed of titanium or a titanium alloy, other suitable lighter materials, or a combination of the foregoing. Accordingly, in such embodiments, the weight of the gas turbine engine 100 can be reduced.

Referring now to FIGS. 3 and 4, as shown in FIG. 3, some of the P3X air that has passed through the aft sealing element 144 continues to flow generally aft or rearward along the axial direction A across the HP shaft 210 and toward the longitudinal centerline past a hub 165 of the impeller 154. Additionally, a portion of the mixed airflow MA from the impeller cavity 138 flows radially inward toward the longitudinal centerline 102 to combine with the P3X air that crossed the HP shaft 210. The P3X airflow and/or mixed airflow MA continues aft or rearward along the axial direction A toward the A-sump assembly 280. As shown in FIG. 4, the P3X airflow and/or mixed airflow MA continues along the HP shaft 210 and flows radially outward through the A-sump passage 418 and into the A-sump plenum 286 to pressurize the first sealing element 290 of the A-sump assembly 280. In this manner, the proper pressure differential across the first sealing element 290 can be achieved. Moreover, some of the P3X airflow and/or mixed airflow MA flows across a rack sealing element 192 and radially outward to cool one or more components of the compressor 122. In addition, as the P3X airflow and/or mixed airflow MA is already pressurized, the P3X airflow and/or mixed airflow MA that enters the core airflow path 110 along the compressor 122 provides improved efficiency of the compressor 122. In this way, the reuse of the P3X airflow and/or mixed airflow MA improves the efficiency of the engine.

With reference to FIG. 3, as noted previously, a second portion 432 of cooled, high pressure P3X air is delivered to the sump plenum 256 and distributed over or about the sump frame 252 generally forward along the actual direction A. The P3X airflow pressurizes the second sealing element 260 of the B-sump assembly 250. As the P3X air is pressurized to a sufficient degree, the pressure differential across the second sealing element 260 is such that the oil mist is maintained within the sump cavity 254 and oil leakage across the second sealing element 260 is minimized and/or reduced. Moreover, in embodiments where the combination of the P3X airflow is sufficiently cooled by the heat exchanger 402, the P3X does not cause coking and/or oil fires within or around the B-sump assembly 250.

After pressurizing the second sealing element 260 and the B-sump assembly 250 more generally, the second portion 432 of P3X airflow flows across a forward sealing element 146 and exits the sump plenum 256. The second portion 432 of P3X airflow then mixes with the mixed airflow MA delivered by the mixed airflow duct 420 and P3 air delivered by an accelerator 428 at a loation forward of the B-sump assembly 250. The resultant airflow is deemed the combination airflow CM herein. The reuse of the mixed airflow MA and P3 airflow effectively reduces the amount of P3X air required to cool other various components of the gas turbine engine 100. In this way, the amount of bleed air can be reduced (i.e., P25 air, P3 air, etc.); and thus, the overall cycle efficiency of the engine can be improved.

Referring still to FIG. 3, as shown, the combination airflow CM may continue onward to cool other various components of the gas turbine engine 100, such as e.g., various components of the HP turbine 172. In particular, as shown in the illustrated embodiment of FIG. 3, the combination airflow CM can be routed from the sump plenum 256 of the B-sump assembly 250 to a turbine blade 184 of the second stage 180 of the HP turbine 172. The combination airflow CM exits the sump plenum 256 through HP shaft aperture 426 and then flows generally forward along the axial direction A through the turbine cooling passage 416. The combination airflow CM then transitions radially outward along the radial direction R and along a rotor of the second stage turbine blade. The combination airflow CM then flows to the turbine cooling passage 416 in a rear or aft direction along the axial direction A and then extends radially outward toward the hub and turbine blade 184 of the second stage 180. In this way, the combination airflow CM, which includes the P3X airflow and other reused airflows, cools the turbine blade 184 of the second stage 180. In other exemplary embodiments, the HP shaft 210 can include other HP shaft apertures that provide airflow communication to the rotor and turbine blade of the first stage of the HP turbine 172. In yet further exemplary embodiments, the turbine cooling passage 416 can extend to cool the stator vane 182 of the second stage 180.

Referring again to FIG. 2, as shown at the rear portion of the B-sump assembly 250, a portion of the P3X airflow flows in a forward direction along the axial direction A radially inward of the HP shaft 210. The P3X airflow then may flow through the LP turbine passage 422 toward the rotor assemblies of the LP turbine 174 for cooling the rotor assemblies and other components of the LP turbine 174, such as one or more stator vanes and one or more turbine blades of the LP turbine 128.

Figure 6:
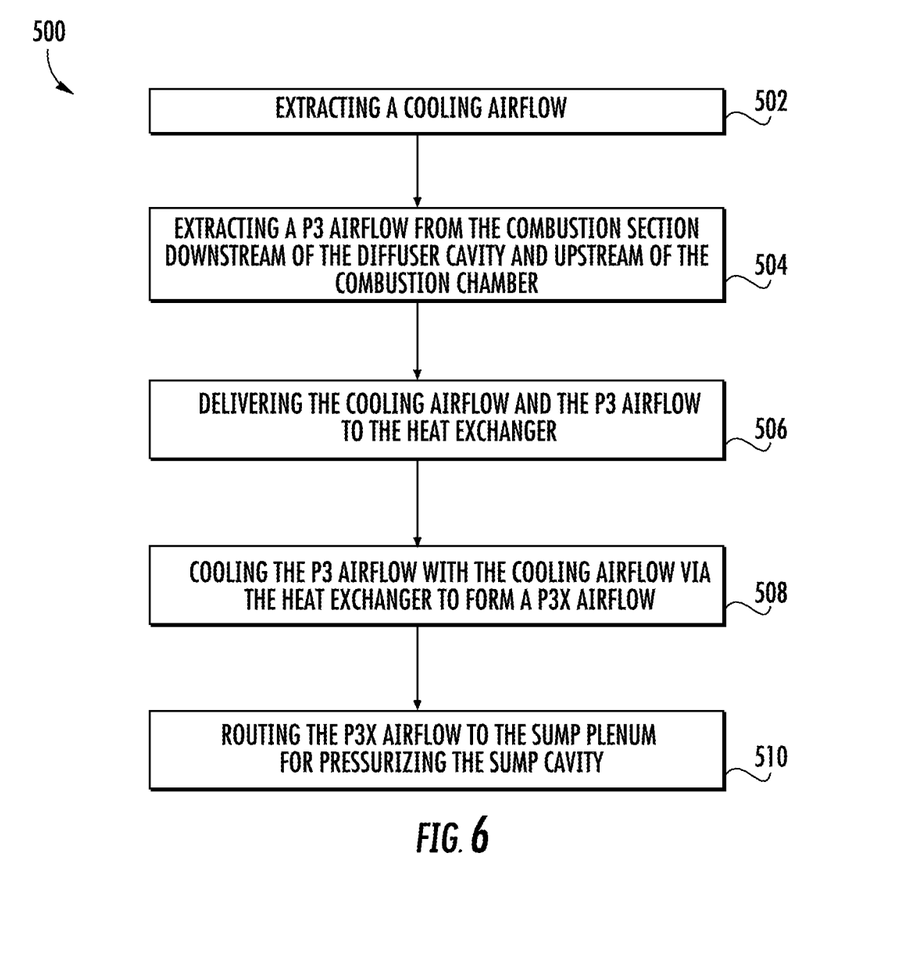
FIG. 6 provides a flow diagram of an exemplary method according to various embodiments of the present subject matter.

FIG. 6 depicts a flow diagram of an exemplary method (500) for cooling and/or pressurizing one or more components of a gas turbine engine, such as e.g., the exemplary gas turbine engine 100 depicted and described herein, according to an exemplary embodiment of the present disclosure. Some or all of the method (500) can be implemented by the air delivery system 400 disclosed herein. In addition, FIG. 6 depicts method (500) in a particular order for purposes of illustration and discussion. It will be appreciated that exemplary method (500) can be modified, adapted, expanded, rearranged and/or omitted in various ways without deviating from the scope of the present subject matter.

At (502), exemplary method (500) includes extracting a cooling airflow CA. For example, the cooling airflow CA can be bay airflow BA, P25 airflow, additional airflows, and/or a combination of the foregoing. In some implementations, the cooling airflow CA is a mixture of bay airflow BA and P25 airflow. In such implementations, a majority of the cooling airflow CA can be bay air and a predetermined amount of P25 air can be extracted from the compressor section 120 depending upon the rate of heat transfer required to sufficiently cool extracted P3 air delivered to the heat exchanger 402.

At (504), exemplary method (500) includes extracting a P3 airflow from the combustion section 150 downstream of the diffuser cavity 125 and upstream of the combustion chamber 124. Depending upon the pressurization and cooling needs of one or more components of the gas turbine engine 100 (such as e.g., one or more components of the B-sump assembly 250), the exemplary HP bleed valve 190 can selectively allow a predetermined amount of P3 air into the exemplary HP bleed duct 414 such that the P3 air can be delivered to heat exchanger 402. For instance, one or more sensors positioned proximate the B-sump assembly 250 can send one or more signals to a controller of the engine indicative of the pressure differential across one or more sealing elements of the B-sump assembly 250. Based upon the one or more signals, the controller communicatively coupled to the HP bleed valve 290 can selectively control the valve position to control the flow of P3 air bled from the combustion section 150. By controlling the amount of P3 air bled from combustion section 150, and consequently the amount of P25 air, only the required amount of bleed air is actually bled from the core airflow path 110. In this manner, more air can remain in the core airflow path 110 for useful work, thereby improving the efficiency of the engine. In some embodiments, the engine controller can be an electronic engine controller having Full Authority Digital Electronic Control (FADEC) capability.

At (506), exemplary method (500) includes delivering the cooling airflow CA and the P3 airflow to the heat exchanger 402. The cooling airflow CA is delivered to the heat exchanger 402 such that it can be used to cool the P3 air extracted from the combustion section 150.

At (508), exemplary method (500) includes cooling the P3 airflow with the cooling airflow CA via the heat exchanger 402 to form a P3X airflow. In some implementations, the P3 airflow can exchange heat with the cooling airflow CA in an air-to-air exchange. Moreover, additionally or alternatively, the P3 airflow can be cooled by other suitable means and suitable fluids.

At (510), exemplary method (500) includes routing the P3X airflow to the sump plenum for pressurizing the sump cavity. In some exemplary implementations, the P3X airflow can be routed to the sump plenum 256 of the B-sump assembly 250 for pressurizing the sump cavity 254. By routing the P3X airflow to the sump plenum 256, the P3X airflow can be distributed over and/or about the sump frame 252 and about the first and second sealing elements 258, 260 of the B-sump assembly 250. In this way, in some embodiments, the pressure differentials across the first and second sealing elements 258, 260 can be properly set, and because the P3X air is cooled to a sufficient degree, the P3X air does not cause coking and/or oil fires within or around the B-sump assembly 250.

In some exemplary implementations, the method (500) further includes extracting a P25 airflow from the compressor section; extracting a bay airflow BA; and, entraining the P25 airflow and the bay airflow BA to form the cooling airflow CA.

In some exemplary implementations, the compressor section 120 further includes an impeller having a backwall 132. Moreover, the gas turbine engine 100 further includes an impeller frame 134 positioned proximate the backwall 132. The backwall 132 and the impeller frame 134 at least partially define the impeller cavity 138, as noted previously. In such exemplary implementations, the method (500) further includes routing the P3X airflow to the impeller cavity 138 to cool the impeller 130. In this way, lighter materials can be used to form the impeller 130, such as e.g., titanium.

In some exemplary implementations, the gas turbine engine 100 further includes an A-sump assembly 280 positioned proximate an inlet 234 defined by an inlet body 236 of the gas turbine engine 100. The A-sump assembly 280 includes an A-sump frame 282 at least partially defining an A-sump cavity 284 and at least partially defining an A-sump plenum 286 opposite the A-sump cavity 284. In such exemplary implementations, the method (500) further includes routing the P3X air to the A-sump plenum 286 for pressurizing the A-sump cavity 284.

In some exemplary implementations, the sump assembly is a B-sump assembly 250 positioned between the compressor section 120 and the turbine section 170. Moreover, in some exemplary implementations the sump assembly is a B-sump assembly positioned between the compressor section 120 and the turbine section 170 along the axial direction A.

In some exemplary implementations, the turbine further includes a first stage and a second stage of turbine stator vanes and turbine blades. In such exemplary implementations, the method (500) further includes routing at least a portion of the P3X air to the second stage of turbine stator vanes and turbine blades. In yet other exemplary implementations, prior to routing the P3X air to the second stage of the turbine stator vanes and turbine blades, the method (500) further includes mixing the P3X air with a P3 airflow. In some exemplary implementations, the turbine is a HP turbine.

In some exemplary implementations, the method (500) further includes routing at least a portion of the P3X air through the LP turbine passage 422 such that the rotor assemblies and other components of the LP turbine 174 can be cooled. The LP turbine passage 422 can be at least partially defined by the turbine frame member 186 separating the HP turbine 172 and the LP turbine 174 of the gas turbine engine 100.

In some exemplary implementations, the gas turbine engine 100 is a reverse-flow gas turbine engine configured as a turboprop engine. In yet other exemplary implementations, the gas turbine engine 100 is a reverse-flow gas turbine engine configured as a turboshaft engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction, a radial direction, and a circumferential direction, the gas turbine engine comprising:
    a nacelle; and
    a core turbine engine comprising:
        a compressor section having a compressor rotatable about the axial direction, the compressor section comprising an impeller;
        a turbine section having a turbine rotatable about the axial direction;
        a shaft extending between and coupling the compressor and the turbine;
        a combustion section disposed downstream of the compressor section and upstream of the turbine section, the combustion section defining a diffuser cavity and including a combustor defining a combustion chamber, the diffuser cavity located upstream of the combustion chamber;
        a sump assembly comprising a sump frame and a bearing assembly positioned between the sump frame and the shaft, the sump frame at least partially defining a sump cavity;
        a sump plenum defined at least partially by the sump frame opposite the sump cavity; and
        an air delivery system, comprising:
            a heat exchanger;
            a cooling duct extending from the compressor section downstream of a plurality of farthest downstream axial compressor blades of the compressor section and upstream of the impeller to the heat exchanger for providing a cooling airflow to the heat exchanger;
            an ejector positioned along the cooling duct for entraining the cooling airflow, wherein the cooling airflow is comprised of a P25 airflow from the compressor and a bay airflow, the bay airflow being bypass airflow extracted from a high bypass duct of the gas turbine engine, ambient air, air extracted from between a space defined between the nacelle of the gas turbine engine and the core turbine engine, or a combination of thereof;
            a high pressure bleed duct extending from the combustion section downstream of the diffuser cavity to the heat exchanger and in airflow communication with the diffuser cavity, the high pressure bleed duct for delivering a P3 airflow to the heat exchanger; and a high pressure duct extending from the heat exchanger to the sump plenum, wherein the heat exchanger is configured to cool the P3 airflow using the cooling airflow to form a P3X airflow, and wherein the high pressure duct is configured to deliver the P3X airflow to the sump plenum for creating a pressure differential between the sump plenum and the sump cavity, wherein the pressure differential prevents a fluid within the sump cavity from leaking from the sump cavity.

2. The gas turbine engine of claim 1, wherein the impeller has a backwall, wherein the gas turbine engine further comprises:

an impeller frame positioned proximate the backwall, wherein the backwall of the impeller and the impeller frame at least partially define an impeller cavity, wherein the impeller frame and the sump frame define an impeller passage that provides airflow communication between the sump plenum and the impeller cavity, and wherein when the high pressure duct provides P3X air to the sump plenum, at least a portion of the P3X air flows from the sump plenum, through the impeller passage, and to the impeller cavity for cooling the impeller.

3. The gas turbine engine of claim 1, wherein the impeller is formed of titanium.

4. The gas turbine engine of claim 1, wherein the turbine further comprises:

a first stage having first stage turbine stator vanes and first stage turbine blades; and a second stage having second stage turbine stator vanes and second stage turbine blades, wherein the shaft defines a turbine cooling passage extending from the sump plenum to the second stage turbine blades, and wherein when the high pressure duct provides P3X air to the sump plenum, at least a portion of the P3X air flows through the turbine cooling passage to the second stage turbine blades for cooling the second stage turbine blades.

5. The gas turbine engine of claim 1, wherein the sump assembly is a B-sump assembly positioned between the compressor and the turbine along the axial direction.

6. The gas turbine engine of claim 5, wherein the gas turbine engine further comprises:

an A-sump assembly positioned proximate an inlet defined by an inlet body of the gas turbine engine, wherein the A-sump assembly comprises:

an A-sump frame, and a first bearing assembly positioned between the A-sump frame and the shaft, wherein the A-sump frame at least partially defines an A-sump cavity in which the first bearing assembly is housed and at least partially defines an A-sump plenum opposite the A-sump cavity, wherein the shaft defines an A-sump passage extending from the sump plenum to the A-sump plenum, and wherein when the high pressure duct provides P3X air to the sump plenum, at least a portion of the P3X air flows through the A-sump passage to the A-sump plenum for pressurizing the A-sump cavity.

7. The gas turbine engine of claim 1, wherein the gas turbine engine further comprises:

a turbine cooling case positioned proximate the turbine and in airflow communication with the heat exchanger, and wherein the cooling airflow is routed to the turbine cooling case after the cooling airflow exchanges heat with the P3 airflow.

8. The gas turbine engine of claim 1, wherein the sump assembly further comprises:

a first sealing element positioned aft of the bearing assembly along the axial direction and connected to the sump frame; and a second sealing element positioned forward of the bearing assembly along the axial direction and connected to the sump frame, wherein the sump plenum is in airflow communication with the first sealing element and the second sealing element.

9. A gas turbine engine defining an axial direction, a radial direction, and a circumferential direction, the gas turbine engine comprising:

a nacelle; and a core turbine engine comprising:

a compressor section having a compressor rotatable about the axial direction, the compressor section comprising an impeller;

a turbine section having a turbine rotatable about the axial direction;

a shaft extending between and coupling the compressor and the turbine;

a combustion section disposed downstream of the compressor section and upstream of the turbine section, the combustion section defining a diffuser cavity and a combustion chamber;

a sump assembly comprising a sump frame at least partially defining a sump cavity;

a sump plenum defined at least partially by the sump frame opposite the sump cavity; and an air delivery system comprising:

a heat exchanger configured to receive a cooling airflow from a cooling duct extending from the compressor section downstream of a plurality of farthest downstream axial compressor blades of the compressor section and upstream of the impeller and a P3 airflow from a high pressure bleed duct extending from the combustion section downstream of the diffuser cavity, wherein the heat exchanger is configured to cool the P3 airflow using the cooling airflow to form a P3X airflow;

an ejector positioned along the cooling duct for entraining the cooling airflow, wherein the cooling airflow is comprised of a P25 airflow from the compressor and a bay airflow, the bay airflow being bypass airflow extracted from a high bypass duct of the gas turbine engine, ambient air, air extracted from between a space defined between the nacelle of the gas turbine engine and the core turbine engine, or a combination of thereof; and a high pressure duct extending from the heat exchanger to the sump plenum for delivering the P3X airflow to the sump plenum for creating a pressure differential between the sump plenum and the sump cavity, wherein the pressure differential prevents a fluid within the sump cavity from leaking from the sump cavity.

10. The gas turbine engine of claim 9, wherein the air delivery system further comprises:
a compressor bleed valve for selectively allowing the P25 airflow from the compressor,
wherein the cooling duct is in airflow communication with the compressor bleed valve.

11. The gas turbine engine of claim 9, wherein the impeller has a backwall, wherein the gas turbine engine further comprises:
an impeller frame positioned proximate the backwall,
wherein the backwall of the impeller and the impeller frame at least partially define an impeller cavity,
wherein the impeller frame and the sump frame define an impeller passage that provides airflow communication between the sump plenum and the impeller cavity, and
wherein when the high pressure duct provides P3X air to the sump plenum, at least a portion of the P3X air flows from the sump plenum, through the impeller passage, and to the impeller cavity for cooling the impeller.

12. A method for cooling and pressurizing one or more components of the gas turbine engine of claim 9,
the method comprising:
extracting the cooling airflow;
extracting the P3 airflow from the combustion section downstream of the diffuser cavity and upstream of the combustion chamber;
delivering the cooling airflow and the P3 airflow to the heat exchanger;
cooling the P3 airflow with the cooling airflow via the heat exchanger to form the P3X airflow; and
routing the P3X airflow to the sump plenum for pressurizing the sump cavity.

13. The method of claim 12, wherein the method further comprises:
extracting the P25 airflow from the compressor section;
extracting the bay airflow; and
entraining the P25 airflow and the bay airflow to form the cooling airflow.

14. The method of claim 12, wherein the compressor section further comprises an impeller having a backwall, the gas turbine engine further comprising an impeller frame positioned proximate the backwall, the backwall and the impeller frame at least partially defining an impeller cavity, and wherein the method further comprises:
routing the P3X airflow to the impeller cavity to cool the impeller.

15. The method of claim 14, wherein the method further comprises:
mixing the P3X airflow with a mixed airflow routed from the impeller cavity, the mixed airflow comprised at least in part of the P3X airflow and a P3 airflow leaked into the impeller cavity proximate a tip of the impeller.

16. The method of claim 12, wherein the gas turbine engine further comprises an A-sump assembly positioned proximate an inlet defined by an inlet body of the gas turbine engine, the A-sump assembly comprising an A-sump frame at least partially defining an A-sump cavity and at least partially defining an A-sump plenum opposite the A-sump cavity, and wherein the method further comprises:
routing the P3X airflow to the A-sump plenum for pressurizing the A-sump cavity.

17. The method of claim 12, wherein the sump assembly is a B-sump assembly positioned between the compressor and the turbine.

18. The method of claim 12, wherein the turbine further comprises a first stage and a second stage of turbine stator vanes and turbine blades, and wherein the method further comprises:
routing at least a portion of the P3X airflow to the second stage of turbine stator vanes and turbine blades.

* * * * *